United States Patent [19]
Wert

[11] Patent Number: 5,272,615
[45] Date of Patent: Dec. 21, 1993

[54] DIGITAL CONTROLLED INVERTER AND METHOD

[76] Inventor: Harry E. Wert, 1210 Glenmore Dr., Apopka, Fla. 32712

[21] Appl. No.: 877,482

[22] Filed: May 1, 1992

[51] Int. Cl.⁵ ............................................. H02M 1/12
[52] U.S. Cl. ...................................... 363/41; 363/56; 363/80
[58] Field of Search .................... 363/25, 26, 41, 42, 363/56, 79, 80, 97

[56] References Cited

U.S. PATENT DOCUMENTS

| | | | |
|---|---|---|---|
| 4,330,816 | 5/1982 | Imazeki et al. | 363/56 |
| 4,524,412 | 6/1985 | Eng | 363/56 |
| 4,553,198 | 11/1985 | Chan et al. | 363/56 |
| 4,847,544 | 7/1989 | Goldberg | 318/696 |
| 4,885,674 | 12/1989 | Varga et al. | 363/21 |

Primary Examiner—William H. Beha, Jr.

[57] ABSTRACT

A digital controlled inverter (100) for inverting an input signal to an alternating current signal having a clock generator (104) for generating a high frequency clock timing signal and a latch (106) for controlling the passage of the clock timing signal to a power stage (102). The power stage (102), which provides a low distortion alternating current signal, is controlled by the latch (106). A control loop (108) is provided for sensing and converting the alternating current signal to a command signal. The command signal controls the state of the latch (106). The latch (106) is reset at the rate of the clock timing signal and updated with the command signal to provide pulse-to-pulse regulation of the alternating current signal. The inverter (100) comprises a transient response to variations in load proportional to the clock timing signal. In a preferred embodiment, the latch (106) functions as a switch for controlling the power output stage (102). The control loop (108) serves to provide the command signal to operate the latch (106). The alternating current signal is rectified and converted to a digital word and then compared to a reference digital word in a digital comparator (138) to provide the command signal to the latch (106).

20 Claims, 5 Drawing Sheets

DIGITAL CONTROLLED INVERTER AND METHOD

BACKGROUND OF THE INVENTION

1. Field of the Invention

The present invention relates to inverters. More specifically, the present invention relates to methods and apparatus for high speed digital controlled inverters for generating an accurate sine-wave from an input voltage.

2. Background

Inverters are incorporated into power supplies and are employed to transform an input voltage to a synthesized alternating current (a.c.) output voltage. A main objective in inverter design is to maintain accuracy of the synthesized a.c. voltage at the output terminal. Without the accuracy, loads sensitive to voltage, frequency variation and distortion will not function properly.

Several techniques of inverter design are known in the prior art. One of these techniques is known as the resonant approach. In the resonant approach, a direct current (d.c.) input signal or a rectified a.c. input signal is inverted to a new a.c. output signal which is generally isolated from the input signal. An objective of the resonant approach to inverter design is to satisfy the minimum distortion requirement for distortion sensitive loads.

In order to satisfy the minimum distortion requirement, a resonant tank circuit is employed. The quality (Q) factor of the tank circuit is selected to be high to control the amount of distortion in the synthesized a.c. output signal. However, this requirement necessitates that all inverter circuits have a high Q-factor. It is difficult to maintain voltage regulation of a high Q-factor circuit. Further, the delay time to register a change at the inverter input terminal and to compensate for a variation in the inverter output terminal (e.g., the load) is increased. Thus, the feedback loop in an inverter employing a resonant tank circuit is slowed by the high Q-factor circuits.

A second technique of inverter design of the prior art is known as the stepped approximation approach. In the stepped approximation approach, a series of different power drivers are assembled. In this synthesizing procedure, the signal is separated into a series of approximations in a power amplifier and thereafter the signal amplitudes are algebraically summed in a magnetic to limit the distortion in the synthesized a.c. output signal. The series of approximations may include sixteen steps of which eight of the steps are directed to the positive half sine-wave (e.g., 0 to $\pi$ radians) and the remaining eight steps are directed to the negative half sine-wave (e.g., $\pi$ to $2\pi$ radians).

Thereafter, the positive half cycle is chopped into eight steps between (0-$\pi$) radians. The eight steps are divided into three portions referred to as the minor, intermediate and major portions. The minor portion includes the first three steps in the sine-wave and delivers only a small amount of power. The intermediate portion includes the middle two steps comprising the top flat of the positive half cycle. The major portion includes the final three steps in the positive half cycle of the sine-wave and delivers the most power. The result is that three separate power amplifiers are created with each delivering a portion of the synthesized signal power. The output signals of the three separate power amplifiers are directed to a power transformer which includes three separate sets of windings. The triggered transformer windings enable the three transformer signals to be magnetically summed to provide the positive half cycle of the synthesized a.c. output signal.

The negative half cycle of the sine-wave is then likewise chopped into eight steps between ($\pi$-$2\pi$) radians. The eight steps are similarly divided into the minor, intermediate and major portions. Three separate power amplifiers are formed each providing a portion of the synthesized output signal. The separate signals are directed to the power transformer where the three triggered transformer windings enable the three transformer signals to be magnetically summed to provide the negative half cycle of the synthesized a.c. output signal.

The distortion in the synthesized sine-wave is approximately (5-10) % which too high for sensitive equipment such as a gyro. In order to minimize the distortion, the sine-wave is divided into a larger number of steps. This is accomplished by adding additional power stages. However, the larger number of steps limits the speed of the transient response. Thus, voltage regulation is slow resulting in instability for non-linear loads. Further, the additional power stages contribute to increased manufacturing costs and excessive weight. Variations of the stepped approximation approach are known but require overdesigning the inverter to adequately supply a non-linear load. Unfortunately, these alternative designs also experience limited transient response, instability, excessive distortion and increased cost and weight.

Thus, a need remains in the art for an improvement in conventional inverter design for providing a synthesized a.c. output signal.

SUMMARY OF THE INVENTION

It is the objective of this invention to provide a low distortion alternating current signal with a digitally controlled inverter having pulse-to-pulse regulation and a transient response to load variations controlled by the clock timing signal.

The digital controlled inverter of this invention has several features, no single one of which is solely responsible for its desirable attributes. Without limiting the scope of this invention as expressed by the claims which follow, its more prominent features will now be discussed briefly. After considering this discussion, and particularly after reading the section entitled, "DETAILED DESCRIPTION OF THE PREFERRED EMBODIMENT," one will understand how the features of this invention provide its advantages, which include the generation of a low distortion alternating current signal, pulse-to-pulse regulation of the alternating current signal, a transient response to load variations controlled by the clock timing signal and unconditional stability.

The need in the art is addressed by the digital controlled inverter and method of the present invention. The invention includes a clock generator for generating a high frequency clock timing signal and a latch for controlling the passage of the clock timing signal to an output stage. A power stage which provides a low distortion alternating current signal is controlled by the latch. A control loop is provided for sensing and converting the alternating current signal to a command signal. The command signal controls the state of the latch. The latch is reset at the rate of the clock timing signal and updated with the command signal to provide pulse-to-pulse regulation of the alternating current signal. The inverter comprises a transient response to variations in load proportional to the clock timing signal.

In a preferred embodiment, the latch functions as a switch for controlling the power output stage. The control loop serves to provide the command signal to operate the latch. The alternating current signal is rectified and converted to a digital word and then compared to a reference digital word in a digital comparator to provide the command signal to the latch.

BRIEF DESCRIPTION OF THE DRAWINGS

The preferred embodiment of this invention, illustrating all its features, will now be discussed in detail. This embodiment depicts the novel and non-obvious digital controlled inverter of this invention shown in the accompanying drawing, which is for illustrative purposes only. This drawing includes the following figures (Figs.), with like numerals indicating like parts.

DESCRIPTION OF THE PREFERRED EMBODIMENT

Figure 1:
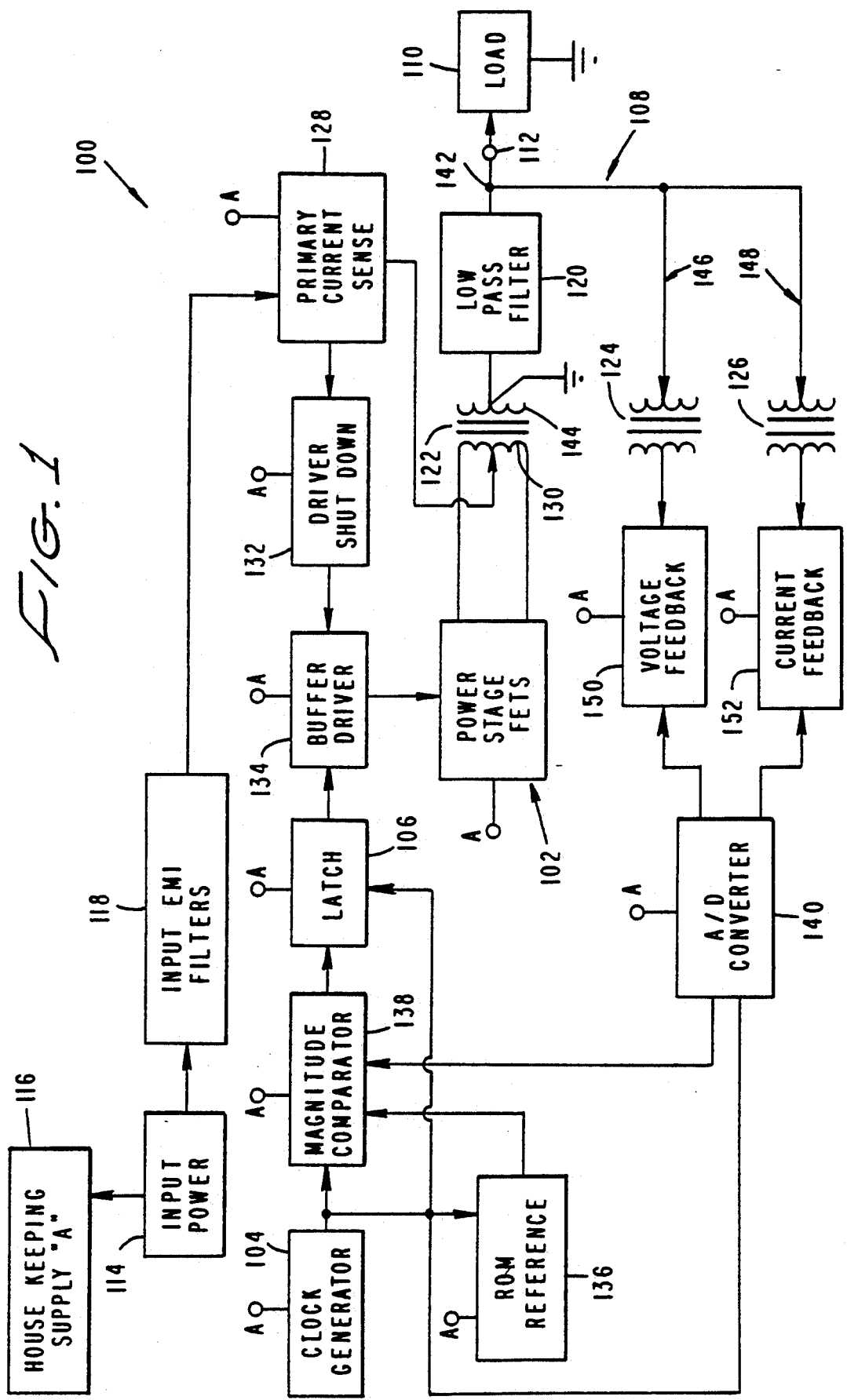
FIG. 1 is a simplified block diagram of an illustrative embodiment of the digital controlled inverter of the present invention showing a control loop.

The invention is embodied in a digital controlled inverter 100 of the type having a power stage 102 controlled by a high frequency clock generator 104 and a latch 106 functioning as a switch, and a control loop 108 for providing fast transient response to changes in a synthesized alternating current (a.c.) output signal caused by variations in a load 110 as shown in FIG. 1.

Generally, the power stage 102, the latch 106 and the control loop 108 cooperate to substantially increase the speed of inversion of an input signal to the synthesized (a.c.) output signal and to cause the switching of the power stage 102 and the transient response to wide and rapid load variations to be at the clock rate of the clock generator 104. Moreover, the inverter 100 of the present invention is absolutely stable down to zero load on an output terminal 112, the size and weight of the inverter packaging is reduced, large power blocks can be incrementally controlled, input/output terminal isolation is simplified, and the use of integrated magnetics is facilitated by high speed operation. Additionally, the synthesized a.c. output signal exhibits minimum distortion and is programmable while the inverter 100 is highly efficient.

The digital controlled inverter 100 is disclosed in FIG. 1 and includes a source of input power 114 having parameters of, for example, (20-30) volts, alternating or direct current. Connected to the source of input power 114 is a logic circuit power supply normally referred to as the housekeeping supply 116 and an input electromagnetic interference (EMI) filter circuit 118.

The housekeeping supply 116 manipulates the raw power from the source of input power 114 to provide a low level direct current (d.c.) housekeeping signal of approximately ($\frac{1}{2}$-1) watt. The housekeeping supply 116 develops a (5-12) volt d.c. signal to operate the digital logic incorporated within the inverter 100. After the inverter logic is operating, the housekeeping supply 116 is deenergized. The low level d.c. signal provided by the housekeeping supply 116 is transmitted to the active elements of the inverter 100 except the input EMI filter circuit 118, a low pass filter 120, a transformer magnetic 122 and a pair of isolation magnetics 124 and 126. The low level d.c. housekeeping signal is identified by the symbol "A" as shown in FIG. 1.

The source of input power 114 also directs the raw power to the input EMI filter circuit 118. The function of the EMI filter circuit 118 is to prevent electronic noise generated within the inverter 100 from feeding back into the source of input power 114 and the associated input power line. Therefore, the EMI circuit 118 filters out high frequency noise of a clock timing signal (e.g., 204.8 KHz or less) to prevent these frequencies from appearing on the input power line. The input power is then delivered to a primary current sense device 128.

The function of the primary current sense device 128 is to monitor the amount of energy that is transmitted from the source of input power 114 to the inverter 100. The primary current sense device 128 is analogous to an overcurrent or protection device which prevents a short circuit from damaging the inverter 100. The origin of the short circuit can be either external in the load 110 or internal to the inverter 100. The primary current sense device 128 regulates a maximum allowable current by monitoring the power line from the source of input power 114 as shown in FIG. 1. When primary current sense has occurred, the input current level to the inverter 100 is inspected.

If upon inspection, the input current to the inverter 100 exceeds a preset maximum limit, the primary current sense device 128 transmits a signal to a driver shutdown device 132. The driver shutdown device 132 thereafter disables a buffer driver 134 which, in turn, deenergizes the power stage 102. As a result, the inverter 100 is protected from the excessive current which would otherwise cause damage. Thus, the combination of the primary current sense device 128 and the driver shutdown device 132 provides the overcurrent protection feature of the present invention.

The function of the clock generator 104 is to provide a high frequency clock timing signal to control the switching rate and the transient response of the digital controlled inverter 100. The timing of each of the remaining elements of the inverter 100 is synchronized to the clock timing signal. An optimum clock speed based upon factors such as efficiency and thermal considerations is selected to maximize power density and to minimize size and weight of the inverter 100. However, as clock rates increase, the losses in the switching elements and the magnetics also increase. A suitable clock rate for the clock timing signal can be, for example, 204.8 KHz.

The 204.8 KHz clock timing signal is directed to a read-only-memory (ROM) reference 136, a magnitude comparator 138, an analog-to-digital (A/D) converter 140 and the latch 106. Generally, the function of the magnitude comparator 138 is to compare a reference digital word transmitted from the ROM reference 136 with a digital word transmitted from the (A/D) converter 140. As a result of this comparison, the magnitude comparator 138 provides a digital comparison signal to the latch 106 which determines the switching state of the power stage 102.

The ROM reference 136 provides a reference signal in the form of a binary number. The reference signal generated by the ROM reference 136 is dynamic and continually changes. The dynamic character of the reference signal is due to the interrogation of the ROM reference 136 by the clock generator 104. The ROM reference 136 provides numerical storage of a sine-wave reference which modulates the clock timing signal for generating the synthesized a.c. output signal at the output terminal 112 as shown in FIG. 1. During each clock timing signal, the ROM reference 136 is caused to update the magnitude comparator 138 with a new reference signal (e.g., new binary number). The new ROM reference binary number supplied to the magnitude comparator 138 determines if power will continue to be supplied to the output terminal 112 or if power will be terminated. This action is accomplished by the magnitude comparator 138 cooperating with the latch 106 and the power stage 102.

In the example illustrated by the preferred embodiment, there are two-hundred fifty-six numbers stored in the ROM reference 136 and the frequency of the synthesized a.c. output signal is 400 Hz (e.g., cycles/sec). If two-hundred fifty-six digital numbers are provided each output cycle and there are four-hundred cycles per second, then an eight-bit wide digital word is provided by the ROM reference 136 to the magnitude comparator 138 every 9.76 microseconds. Therefore, approximately every ten microseconds, a new reference digital number is delivered to the magnitude comparator 138. Over the course of each cycle, the synthesized a.c. output signal (which is a sine-wave) is chopped into two-hundred fifty-six components by the operation of the ROM reference 136. This feature permits the transient response of the control loop 108 to be vastly improved since each component of the sine-wave operates in a small quanta of time. This advantageous result is accomplished with a single stage inverter.

The A/D converter 140 receives a sample of the synthesized a.c. output signal from a loop sense point 142 as shown in FIG. 1. The synthesized output signal is an a.c. analog signal which is converted to an eight-bit wide digital word by the A/D converter 140. The eight-bit wide digital word which represents the sample of the synthesized a.c. output signal, is transmitted to the magnitude comparator 138. The eight-bit wide digital word received from the A/D converter 140 is compared in the magnitude comparator 138 with the eight-bit wide reference digital word (e.g., modulated clock timing signal) received from the ROM reference 136. The result of the comparison of the two digital words determines the state of operation of the power stage 102 in the following manner.

The comparison signal represents one of three possible states. The digital word from the A/D converter 140 is either greater than, equal to or less than the reference digital word from the ROM reference 136. The comparison signal from the magnitude comparator 138 is stored in the latch 106. Because the reference digital word from the ROM reference 136 is updated every ten microseconds, the comparison signal generated by the magnitude comparator 138 is constantly changing. Instantaneous instructions must be provided to the latch 106 and the buffer driver 134 as to the next state of the power stage 102. The power stage switching instructions will be either to switch or not to switch the power field effect transistors (hereinafter FET's) to the opposite state. If the power stage 102 is switched, the state of the power FET's (not shown) is reversed. If the power stage 102 is not switched, the state of the power FET's is unchanged. Thus, if the power FET's are on, they remain on and if the power FET's are off, they remain off.

If the digital word representing the synthesized a.c. output signal from the A/D converter 140 is greater than the reference digital word, then additional energy is not required at the output terminal 112 from the power stage 102. Therefore, the comparison signal transmitted from the comparator 138 to the latch 106 ensures that the power stage 102 is not switched on. Therefore, if the power FET's are off, they remain off and if the power FET's are on, they are switched off. However, if the digital word representing the synthesized a.c. output signal from the A/D converter 140 is less than the reference digital word, then additional energy is required at the output terminal 112 from the power stage 102. Under these conditions, the comparison signal transmitted to the latch 106 ensures that the power stage 102 is switched on. Thus, if the power FET's are on, they remain on and if the power FET's are off, they are switched on.

The condition in which the digital word representing the synthesized a.c. output signal is equal to the reference digital word is indeterminate and thus is not recognized. The probability of this condition occurring is very low and thus the next state of the power stage 102 is duplicate to that of the previous state. In general, no significant degradation results from this approximation.

The latch 106 is a switching and memory device which receives the comparison signal from the magnitude comparator 138 to control the buffer driver 134. In effect, the latch 128 serves as a digital control valve in the following way. The 204.8 KHz clock timing signal received at the latch 106 from the clock generator 104 forces the logic in the latch 106 to be interrogated at the clock rate. The latch 106 is a memory device that stores the signal from the magnitude comparator 138 for the duration of the clock timing signal e.g., for approximately ten microseconds, for controlling the synthesized a.c. output signal.

The interrogation of the latch 106 by the 204.8 KHz clock timing signal resets the latch 106 to zero. Immediately after being reset to zero, the latch 106 receives an updated logic signal from the magnitude comparator 138. The updated signal is a first logical signal if more power is required at the output terminal 112. This condition indicates that the digital word representing the synthesized a.c. output signal from the A/D converter 140 is less than the reference digital word from the ROM reference 136. An appropriate signal is then transmitted to the buffer driver 134 to cause the buffer driver to be "switched on". This action ensures that the power stage 102 will deliver power to the transformer magnetic 122.

However, if the demand for power at the output terminal 112 has decreased, the updated signal from the magnitude comparator 138 is a second logical signal. This condition indicates that the digital word representing the synthesized a.c. output signal from the A/D converter 140 is greater than the reference digital word from the ROM reference 136. An appropriate signal is then transmitted to the buffer driver 134 to cause the buffer driver to be "switched off". This action ensures that the power stage 102 will not deliver power to the transformer magnetic 122. The updated signal from the magnitude comparator 138 has a transient value and varies with the load 110.

The memory of the latch 106 is interrogated and updated at the clock rate to clear obsolete information from the latch. The magnitude comparator 138 generates an output signal based upon a one millivolt error limitation. Thus, if the synthesized a.c. output signal of the inverter 100 is within one millivolt of the reference digital word, then an output signal exists at the magnitude comparator 138. The resetting and updating of the latch 106 in this manner provides incremental or pulse-to-pulse regulation of the synthesized a.c. output signal.

The process described above controls how the output signal from the latch 106 is delivered to the buffer driver 134. The inverter 100 of the present invention substantially improves the transient response to widely and rapidly changing conditions of the load 110 at the output terminal 112 because of the incremental correction provided by the control loop 108. Further, improved transient response at the rate of the clock timing signal exists even when the load 110 is non-linear. At a clock rate of 204.8 KHz, a correction signal in response to load variations is present at the input to the buffer driver 134 in approximately five clock pulses (e.g., ten microseconds). The present invention regulates the synthesized a.c. output signal, not the input voltage to the inverter 100.

The buffer driver 134 is controlled by the latch 106 and thus serves as a switch to control the power stage 102. The buffer driver 134 further serves to amplify the signal received from the latch 106 to more accurately control the power FET's (not shown). The output signal from the buffer driver 134 is delivered to the power stage 102. The power stage 102 can include a single stage push-pull converter incorporating the switching FET's (not shown) to shape the waveform to provide the desired output signal.

In particular, the switching FET's of the power stage 102 function to chop the raw input power 114 into discrete quanta in accordance with the ROM reference 136. Thereafter, the discrete quanta of power are applied to the primary winding 130 of the transformer magnetic 122. Thus, the power stage 102 serves as a power control valve and is the only power element included within the inverter 100. It is noted that the performance of the switching FET's diminishes as the clock rate increases. This is because a significant amount of energy is required to drive the relatively large power FET gate capacitors (not shown). Further, the combination of switching times coupled with delay times will ultimately account for the preponderance of the power loss.

It is noted that cross-conduction circuitry (not shown) is provided to prevent the push-pull stages of the power stage 102 from switching simultaneously. The cross-conduction circuitry can be an analog circuit or a digital circuit comprised of components known to those skilled in the art. Generally, the output terminal of the cross-conduction circuitry exhibits a high impedance. However, the input terminal to the power stage 102 requires a low impedance to properly operate the logic. Therefore, the buffer driver 134 is also employed as a low impedance buffer to convert the high impedance output of the cross-conduction circuitry (not shown) to a low impedance output for interfacing with the input to the power stage 102. The buffer driver 134 can be, for example, a unitrode field effect transistor (FET) driver.

The output signal of the power stage 102 is an a.c. signal which is delivered to the transformer magnetic 122. The transformer magnetic 122 serves a plurality of functions which include providing a coupling media from the power FET's to the output terminal 112, providing direct current (d.c.) isolation between the power stage 102 and the output terminal 112 and providing level shifting. Since the voltage level utilized by the power FET's in the power stage 102 is lower than the voltage level at the output terminal 112, the output voltage associated with the synthesized a.c. output signal must be increased. The transformer magnetic 122 is designed to operate at the same frequency as the clock timing signal. An additional function of the transformer magnetic 122 is to serve as a "step-up/step-down" transformer. The primary winding 130 of the transformer magnetic 122 is center tapped and connected to the source of input power 114 via the primary current sense device 128 as shown in FIG. 1. This connection translates the low impedance of the input power 114 to the output terminal 112.

A secondary winding 144 of the transformer magnetic 122 is connected to the low pass filter 120. The low pass filter 120 serves to filter out the high frequency harmonic components from the synthesized a.c. output signal. The high frequency harmonics are generated as a result of synthesizing a 400 Hz output signal from a 204.8 KHz clock timing signal. The low pass filter 120 is a second order output filter which comprises an inductor and capacitor combination (not shown) made resonant at the third harmonic. This design provides the synthesized a.c. output signal which in the present invention is a low distortion sine-wave.

The inductor of the low pass filter 120 eliminates high current surges when the inverter 100 is energized and can be positioned on the primary side, the secondary side or integrated into the design of the transformer magnetic 122. The best performance and efficiency is attained when the inductor is placed on the primary side of the transformer magnetic 122. The secondary winding 144 is also center tapped. The center tap of the secondary winding 144 and the capacitor (not shown) of the low pass filter 120 are each connected to electrical ground for completing a circuit as shown in FIG. 1. The synthesized a.c. output signal appears at the output terminal 112. For purposes of illustration and not by way of limitation, the synthesized a.c. output signal is chosen to be a 115 volt a.c., 400 Hz isolated output signal. Further, the load 110 is shown connected between the output terminal 112 and ground.

Regulation of the synthesized a.c. output signal due to changes in the input voltage and variations in the load 110 is provided by voltage feedback. Generally, the synthesized a.c. output signal is detected and processed in the appropriate feedback path, converted to the digital word in the A/D converter 140 and thereafter compared to the reference digital word provided by the ROM reference 136. The comparison signal of the magnitude comparator 138 is then fedback to the buffer driver 134 to control the amplitude of the synthesized a.c. signal provided by the power stage 102. This detection is accomplished with peak sensing before and after the low pass filter 120 for load regulation and thereafter averaged to improve line regulation. Dynamic regulation a significant improvement in transient response while affording immediate protection to internal electronics.

Located between the low pass filter 120 and the output terminal 112 is the loop sense point 142. The loop sense point 142 is the starting point for two parallel paths of the control loop 108. The first parallel path is a voltage feedback loop 146 and the second parallel path is a current feedback loop 148.

The digital controlled inverter 100 receives current feedback from the primary side of the regulated a.c. output which affords the protection of components in the case of overload or short circuit at the output terminal 112. For load currents in excess of maximum, current feedback from the secondary side of the control loop design transforms the inverter 100 from a constant voltage generator to a constant current generator. This feature not only protects the inverter 100 but also provides a continuing source of energy to aid in the clearing of circuit breakers and fuses. The resolution (e.g., distortion) attained by this approach is limited only by the practical switching capabilities of the active logic components.

The foregoing features of the control loop 108 are accomplished in the following manner. The control loop 108 comprises the loop sense point 142 connected to the pair of isolation magnetics 124 and 126, respectively, as shown in FIG. 1. The isolation magnetics 124 and 126 are connected to a voltage feedback device 150 and a current feedback device 152, respectively. The voltage feedback device 150 and the current feedback device 152 are each connected to the A/D converter 140 which, in turn, is connected to the magnitude comparator 138. Each of the magnetics 124 and 126, respectively, are provided to prevent any d.c. signal operating above ground potential and superimposed upon the synthesized a.c. output signal from being fedback to the inverter 100 through the control loop 108.

The isolation magnetic 124 positioned within the voltage feedback loop 146 delivers the synthesized a.c. output signal to the voltage feedback device 150. The voltage feedback device 150 detects and processes the synthesized a.c. signal. In particular, the voltage feedback device 150 includes a full-wave bridge (not shown) for rectifying the synthesized a.c. signal to a pulsating d.c. signal. A storage capacitor (not shown) is also included within the voltage feedback device 150 for filling in the gaps of the pulsating d.c. signal. Therefore, the output d.c. signal transmitted from the voltage feedback device 150 to the A/D converter 140 is a reasonably pure d.c. signal. The synthesized a.c. signal is rectified to a d.c. signal to improve the efficiency of the A/D conversion process.

The voltage feedback loop 146 just described represents the constant voltage portion of the control loop 108 and is the normal feedback path. The voltage feedback loop 146 provides a 115 volt (RMS), 400 Hz synthesized a.c. output signal. The constant voltage is in terms of the RMS component since the synthesized output signal is a sine-wave. The voltage feedback loop 146 also provides a voltage level shifting function to adjust the voltage levels between the output terminal 112 and the voltage feedback device 150.

The isolation magnetic 126 positioned within the current feedback loop 148 delivers the synthesized a.c. output signal to the current feedback device 152. The current feedback device 152 detects and processes the synthesized a.c. signal. In particular, the current feedback device 152 also includes a full-wave bridge (not shown) for rectifying the synthesized a.c. signal to a pulsating d.c. signal. A second storage capacitor (not shown) is also included within the current feedback device 152 for filling in the gaps of the pulsating d.c. signal to provide a reasonably pure d.c. signal to the A/D converter 140. As in the voltage feedback loop 146, the synthesized a.c. signal is rectified to a d.c. signal to improve the efficiency of the A/D conversion process.

Additionally, a resistor element (not shown) having a small resistive value is included in the current feedback device 152. The voltage drop measured across the resistor element (not shown) in the current feedback device 152 is proportional to the electrical energy transmitted to the load 110. When the voltage drop measured across the resistor element (not shown) exceeds a preset value (e.g., indicating excessive current), then an abnormal condition exists. For example, if the excessive current is due to an overload such as a fault at the load 110, a relatively large voltage is developed across the resistor element (not shown).

During a high current situation, the current feedback loop 148 becomes the dominant loop in the control loop 108. This condition introduces the constant current portion of the control loop 108 and the inverter 100 enters the constant current mode. The constant current mode is the abnormal condition for the control loop 108 and occurs only under excessive current conditions. As a practical matter, a high current condition occurring on the input line from the source of input power 114 would be sensed by the primary current sense device 128 and interrupted by the driver shutdown device 132. The current feedback device 152 normally operates when an otherwise normal condition shifts to an abnormal condition.

In order to minimize switching losses, the inverter 100 operates with a variable clock speed. While synthesizing the portion of the sine-wave represented from (0-45) degrees and from (135-180) degrees, a lower switching frequency is utilized. When synthesizing the portion of the sine-wave between (45-135) degrees, the switching frequency is doubled. Since the voltage waveform changes rapidly, close regulation is not necessary in those portions of the sine-wave {e.g., from (0-45) and (135-180) degrees}. Therefore, the switching frequency (e.g., the clock timing signal) of the inverter 100 can be halved.

Halving the switching frequency in this manner improves the efficiency of the inverter 100 by (4-5) %, provides good dynamic response and low distortion for a minor increase in circuit complexity. The halving of the switching frequency is accomplished within the logic circuitry of the clock generator 104. Since the clock generator 104 continually interrogates the ROM reference 136, the position of the synthesized sine-wave is known. Thus, the clock generator 104 can change the switching frequency at the appropriate position on the sine-wave.

Figure 2:
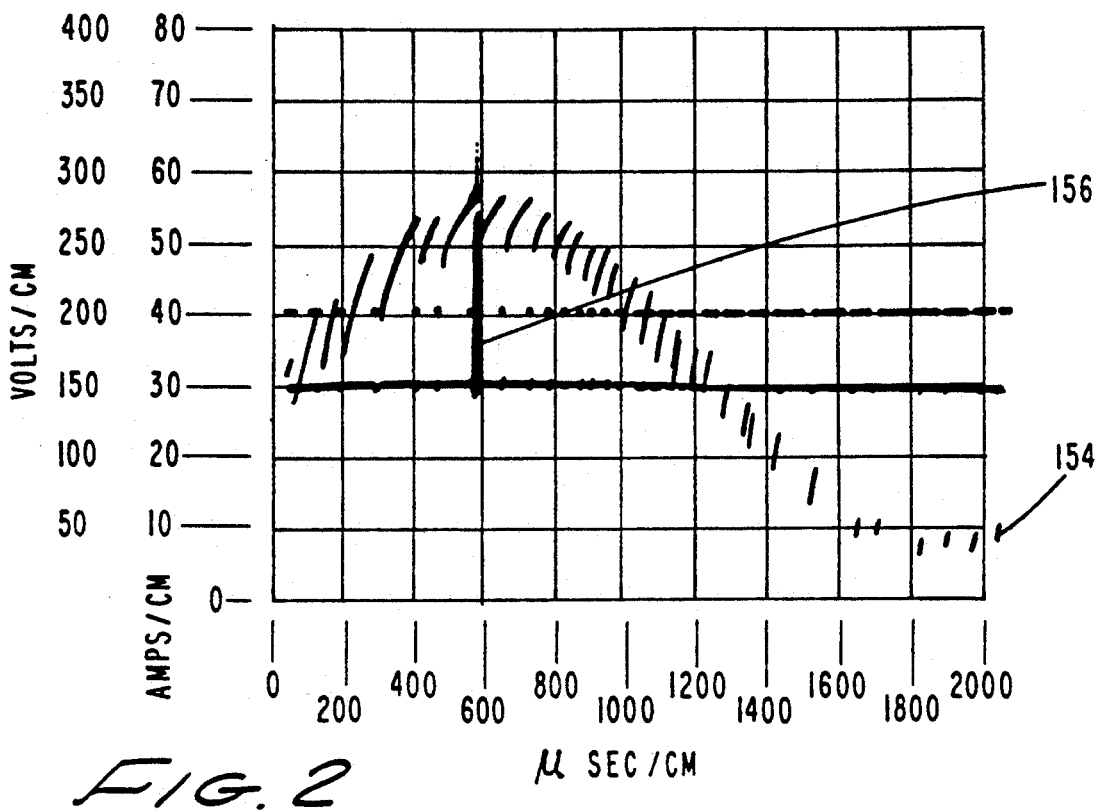
FIG. 2 is a diagram showing a sinusoidal waveform of the input power line current and a digital waveform monitoring a power FET of a power stage of FIG. 1.

The performance of the inverter 100 when supplying 1500 watts of electrical power to a resistive load 110 is shown in FIG. 2. The sinusoidal waveform of the analog current on the input power line to the inverter 100 is identified by the numeral 154. Also, the digital waveform at the center of FIG. 2 is the corresponding pulse width modulation when monitoring the drain of a power FET and is identified by the numeral 156. The first vertical scale representing the analog current 154 is 10 amps/cm. The second vertical scale representing the digital pulse of the power FET drain 156 is 50 V/cm. The horizontal scale for both of the vertical scales is 200 microseconds/cm.

Figure 3:
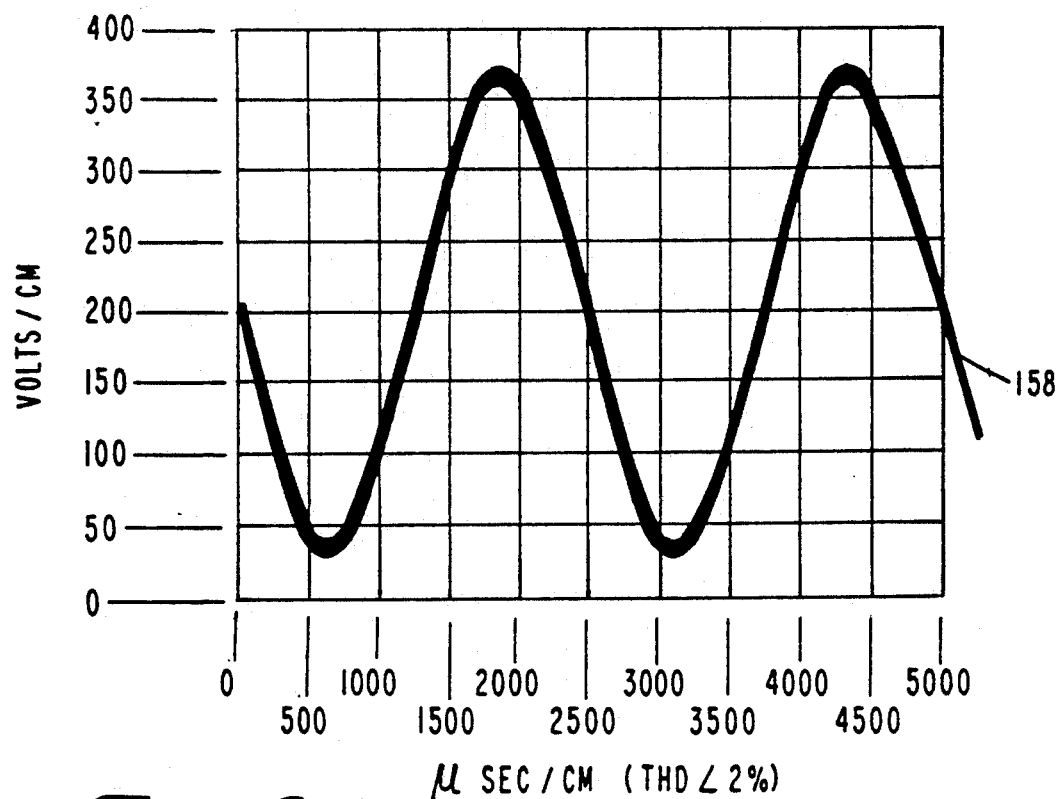
FIG. 3 is a waveform diagram of the sinusoidal a.c. output voltage when the inverter of FIG. 1 is driving a high wattage resistive load.
Figure 4:
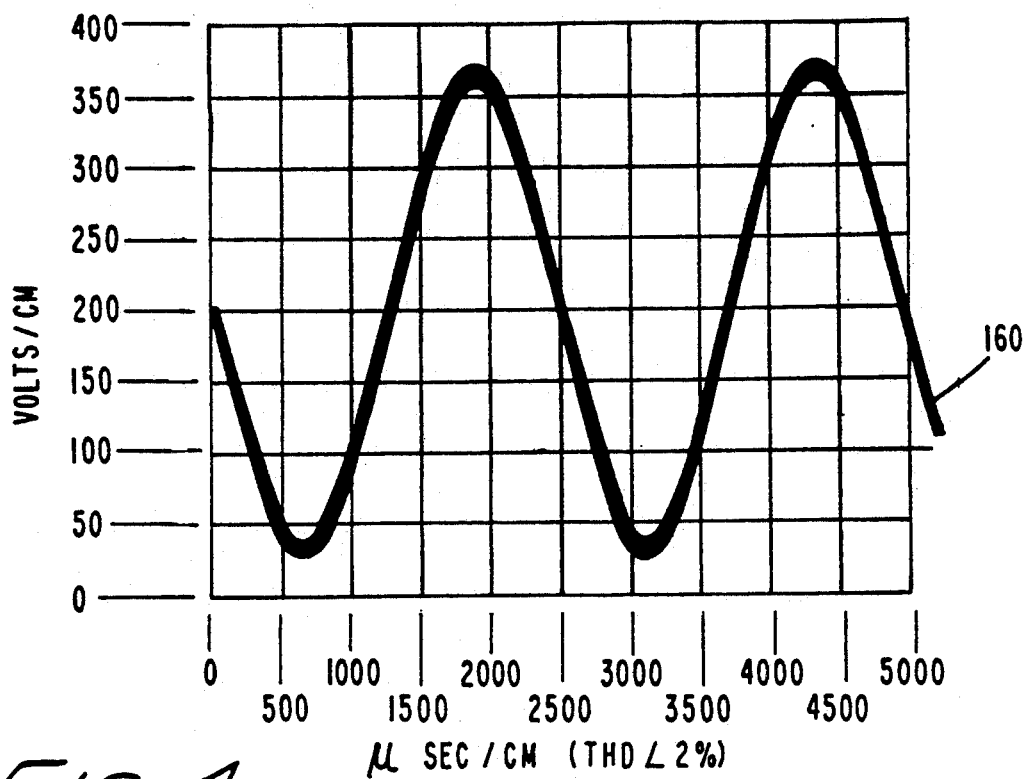
FIG. 4 is a waveform diagram of the sinusoidal a.c. output voltage when the inverter of FIG. 1 is driving a heavy non-linear load.

The waveforms associated with performance of the inverter 100 when driving a 1000 watt resistance load and a 1050 VA non-linear load are shown in FIGS. 3 and 4, respectively. FIG. 3 illustrates a sinusoidal output voltage waveform identified by the numeral 158 for the inverter 100 driving the 1000 watt resistive load. The voltage waveform of FIG. 3 includes a vertical scale of 50 volts/cm and a horizontal time scale of 500 microseconds/cm with a total harmonic distortion of less than 2%.

FIG. 4 illustrates a sinusoidal output voltage waveform identified by the numeral 160 for the inverter 100 driving the 1050 VA non-linear load. The voltage waveform of FIG. 4 includes a vertical scale of 50 volts/cm and a horizontal time scale of 500 microseconds/cm with a total harmonic distortion of less than 2%. Comparison of the voltage waveforms 158 and 160 of FIGS. 3 and 4, respectively, clearly illustrate the ability of the inverter 100 to track the non-linear load characteristics. These characteristics are similar to the load presented by the power supply contained within a typical personal computer having a capacitor input filter.

Figure 5:
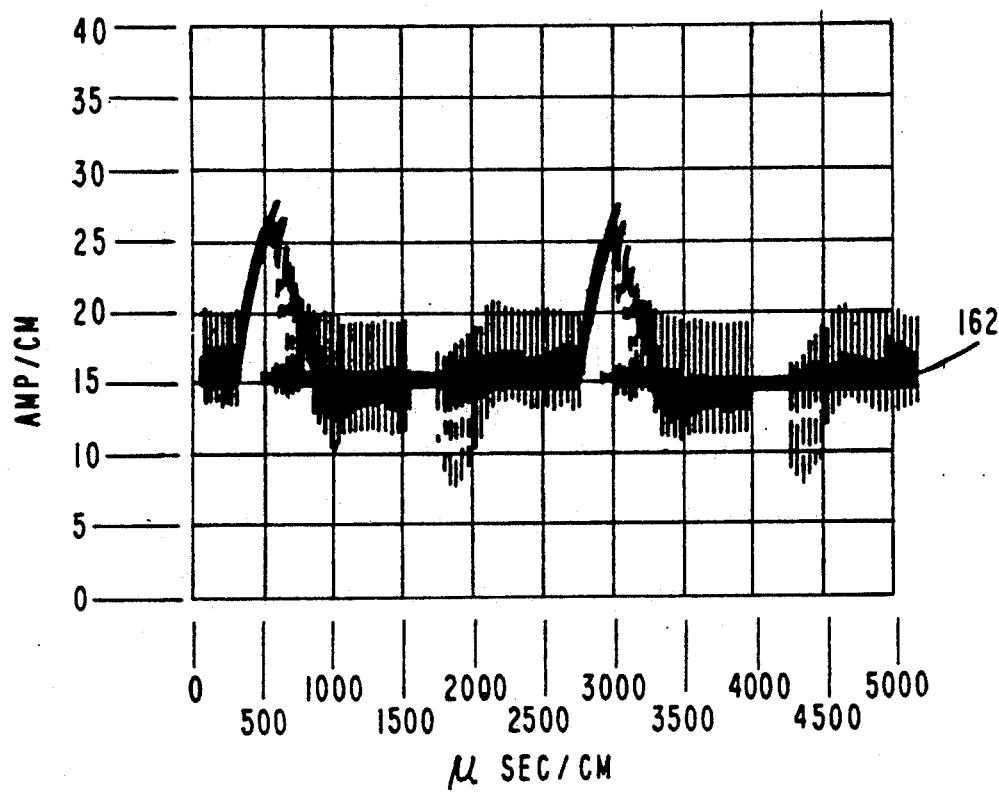
FIG. 5 is a waveform diagram illustrating the drain current of a power stage FET when the inverter of FIG. 1 is driving a heavy non-linear load.
Figure 6:
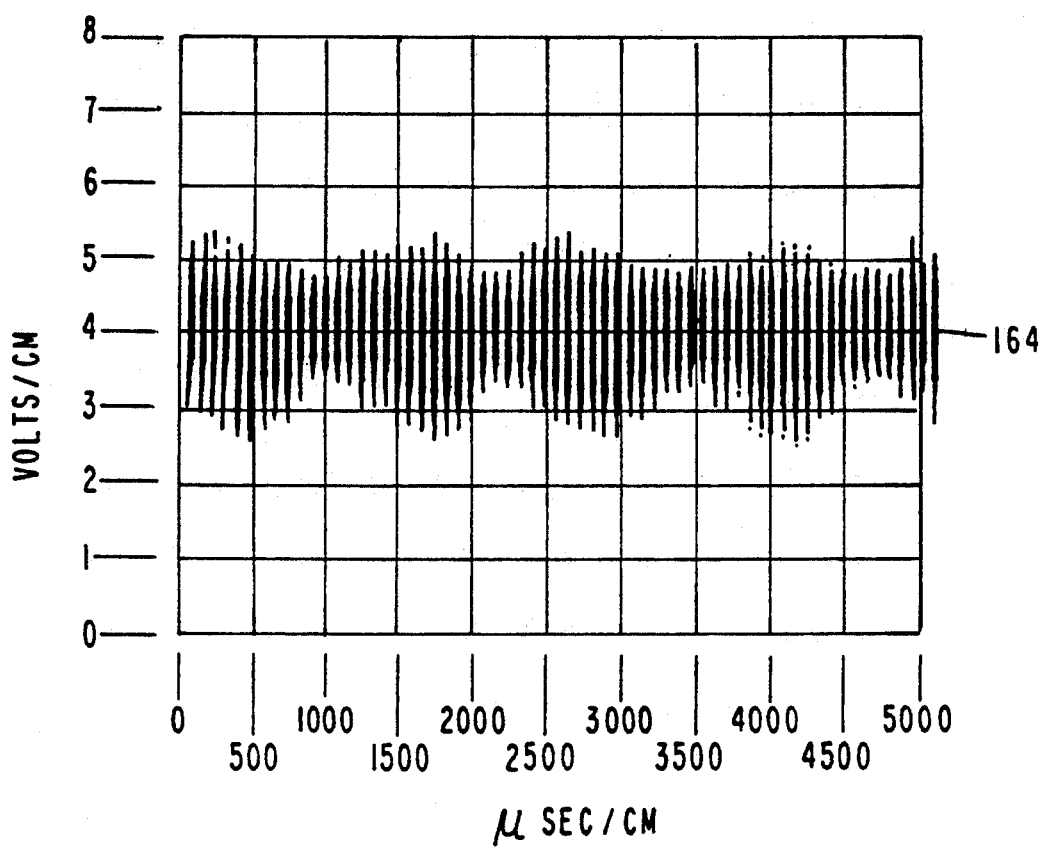
FIG. 6 is a waveform diagram illustrating the inverter input voltage when the inverter of FIG. 1 is driving a high wattage resistive load.

The waveforms associated with FIGS. 5 and 6 also illustrate performance of the inverter 100 when driving the 1050 VA non-linear load and the 1000 watt resistance load, respectively. The waveform of FIG. 5 identified by the numeral 162 shows the drain current of one of six power FET's of the power stage 102 driving the 1050 VA non-linear load. The vertical scale of FIG. 5 is 5 amps/cm and the horizontal time scale is 500 microseconds/cm.

The waveform of FIG. 6 identified by the numeral 164 shows the input voltage on the input power line of the inverter 100 when driving the 1000 watt resistive load. The vertical scale of FIG. 6 is 1 volt/cm and the horizontal time scale is 500 microseconds/cm. Driving the heavy 1050 VA non-linear load as shown in FIG. 5 is a non-trivial task for the control loop 108 to track while maintaining the low output distortion as shown by the waveform in FIG. 6.

The design of the inverter 100 is easily adaptable to a wide range of requirements. Generally, the inverter 100 is rated as a 1 KVA, 115 VAC, 400 Hz at the output terminal 112 and requires an input voltage range of (25-30) volts (a.c. or d.c.) from the source of input power 114. The following Table 1 serves to highlight some of the most important characteristics such as voltage regulation, efficiency and output distortion.

TABLE 1

| Input Voltage | Output Voltage | Efficiency Percent | Distortion Percent |
|---|---|---|---|
| 20 | 114.95 | 88.76 | 1.30 |
| 22 | 115.00 | 86.39 | 1.32 |

TABLE 1-continued

| Input Voltage | Output Voltage | Efficiency Percent | Distortion Percent |
|---|---|---|---|
| 24 | 114.88 | 86.46 | 1.46 |
| 26 | 114.85 | 85.67 | 1.49 |
| 28 | 114.82 | 85.18 | 1.64 |
| 30 | 114.80 | 84.51 | 1.72 |

A very significant feature concerning the data of Table 1 is that efficiency improves as the input voltage is reduced. This feature is inverse to and provides a distinct advantage over other comparable units of the prior art. The fact that efficiency improves as the input voltage is reduced translates into extending the service time when operating from a battery source.

Figure 7:
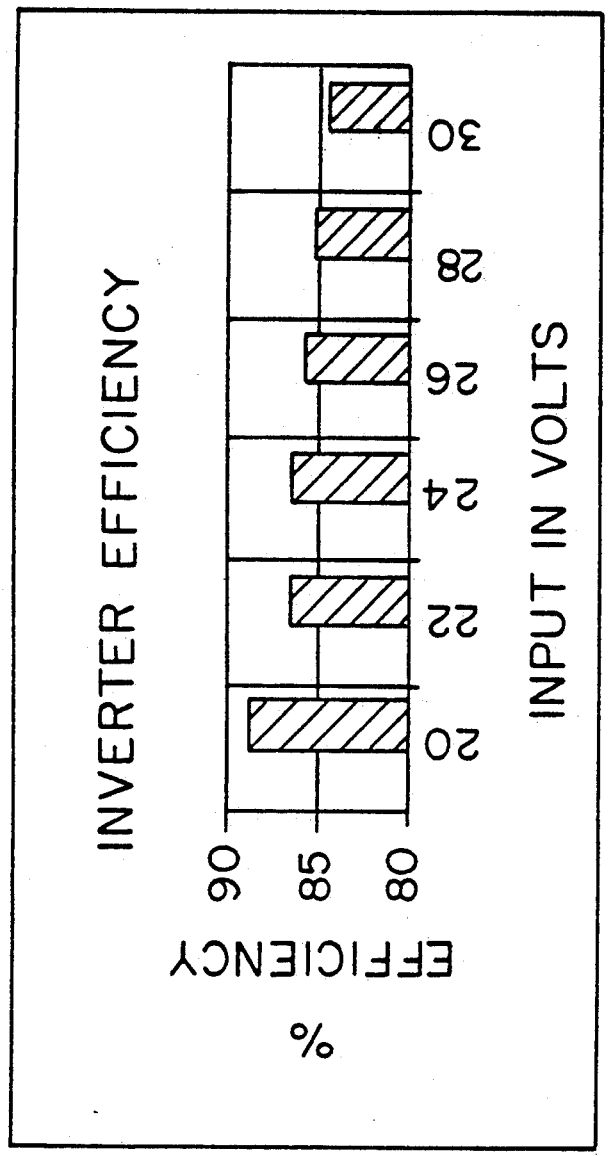
FIG. 7 is a graph comparing efficiency versus input voltage when the inverter of FIG. 1 is driving a high wattage resistive load.

The digital construction of the inverter 100 lends itself to minimal package density. A graph of % efficiency versus input voltage for the 1 KVA inverter 100 is shown in FIG. 7. The graph, which represents raw data measured while driving a 1 KW resistive load, includes a horizontal scale which measures input voltage in volts and a vertical scale which measures % efficiency. The efficiency varies approximately between 85% and 89%. The bulk of the power loss is associated with the power FET's of the power stage 102. The core losses of the transformer magnetic 122 are approximately two watts. When driving heavy non-linear loads, the efficiency is approximately 10% less due to the very high peak currents processed by the active FET switching devices.

The present invention provides many advantages. Major advantages include that the transient response is proportional to the clock rate of the clock generator 104, packaging is minimized and the inverter 100 is unconditional stable to zero load. As the clock rate increases, the control loop 108 is capable of responding more rapidly to load variations at the output terminal 112. Further, the speed of operation is limited only by the practical switching capabilities of logic components. Various types of dynamic loads including large inductive, capacitive and resonant configurations have been investigated. Instability in the operation of the inverter 100 did not exist.

It was further determined that the output voltage could easily be made programmable, that multi-frequency operation, if utilized, raises equivalent ripple frequency, that paralleling of multiple output sections will not cause instability, that large blocks of power can be controlled incrementally, that input/output isolation is simplified since the control signal is digital, and that high speed operation facilitates the use of integrated or flat magnetics.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiment disclosed.

On the contrary, the invention is to cover all modifications and alternate constructions coming within the spirit and scope of the invention as generally expressed by the following claims, which particularly point out and distinctly claim the subject matter of the invention:

1. A digital controlled inverter comprising: signal;
   latching means for controlling the passage of said clock timing signal to an output stage;
   power means located within said output stage for providing a low distortion alternating current signal, said power means controlled by said latching means; and
   control loop means for sensing and converting said alternating current signal to a command signal,
   wherein said command signal controls the state of said latching means, said latching means being reset at the rate of said clock timing signal and updated with said command signal to provide pulse-to-pulse regulation of said alternating current signal, said inverter comprising a transient response to variations in load proportional to said clock timing signal.

2. The digital controlled inverter of claim 1 wherein said generating means includes a clock pulse generator.

3. The digital controlled inverter of claim 1 wherein said latching means includes a latch.

4. The digital controlled inverter of claim 1 wherein said power means includes an electronic power output stage.

5. The digital controlled inverter of claim 1 wherein said control loop means includes a voltage feedback circuit to sense and convert said alternating current signal to a direct current signal.

6. The digital controlled inverter of claim 1 wherein said control loop means includes a current feedback circuit to sense and convert said alternating current signal to a constant current direct current signal 7. The digital controlled inverter of claim 1 wherein said control loop means includes an analog-to-digital converter for converting a direct current signal to an equivalent digital signal.

8. The digital controlled inverter of claim 1 wherein said control loop means includes a read-only memory device for providing a digital word reference.

9. The digital controlled inverter of claim 1 wherein said control loop means comprises a comparator for generating said command signal.

10. The digital controlled inverter of claim 1 further including a buffer driver circuit to amplify said command signal received from said latching means.

11. The digital controlled inverter of claim 1 further including a transformer magnetic for isolating said power means from an output terminal.

12. The digital controlled inverter of claim 1 further including a low pass filter for removing harmonic components from said alternating current signal.

13. The digital controlled inverter of claim 1 further including an electromagnetic interference filter for blocking high frequency noise generated by said generating means from entering an input power line.

14. The digital controlled inverter of claim 1 further including an over-current circuit for sensing and terminating an over-current condition.

15. The digital controlled inverter of claim 1 further including a driver shutdown circuit for disconnecting said power means in response to an overcurrent condition.

16. A digital controlled inverter comprising:
    a clock generator for generating a high frequency clock timing signal;
    a latch for controlling the passage of said clock timing signal to an output stage;
    power means located within said output stage for providing a low distortion alternating current signal, said power means controlled by said latch; and
    control loop means for sensing and converting said alternating current signal to a command signal,
    wherein said command signal controls the state of said latch, said latch being reset at the rate of said clock timing signal and updated with said command signal to provide pulse-to-pulse regulation of said alternating current signal, said inverter comprising a transient response to variations in load proportional to said clock timing signal.

17. A method for providing digital controlled inversion of an input signal to an alternating current signal, said method comprising the steps of:
    generating a high frequency clock timing signal;
    controlling the passage of said clock timing signal to an output stage;
    providing a low distortion alternating current signal from said output stage controlled by a latch;
    sensing and converting said alternating current signal to a command signal;
    latching said command signal and controlling the state of said latch with said command signal;
    resetting said latch at the rate of said clock timing signal;
    updating said latch with said command signal to provide pulse-to-pulse regulation of said alternating current signal; and
    providing a transient response to variations in load proportional to said clock timing signal.

18. The method of claim 17 further including the step of isolating said output stage from an output terminal with a transformer magnetic.

19. The method of claim 17 further including the step of filtering said alternating current signal to remove harmonic components.

20. The method of claim 17 further including the step of sensing and terminating an over-current condition with an over-current circuit.

* * * * *